J. A. TRUMAN.
NUT LOCK.
APPLICATION FILED FEB. 7, 1911.
1,037,085.
Patented Aug. 27, 1912.
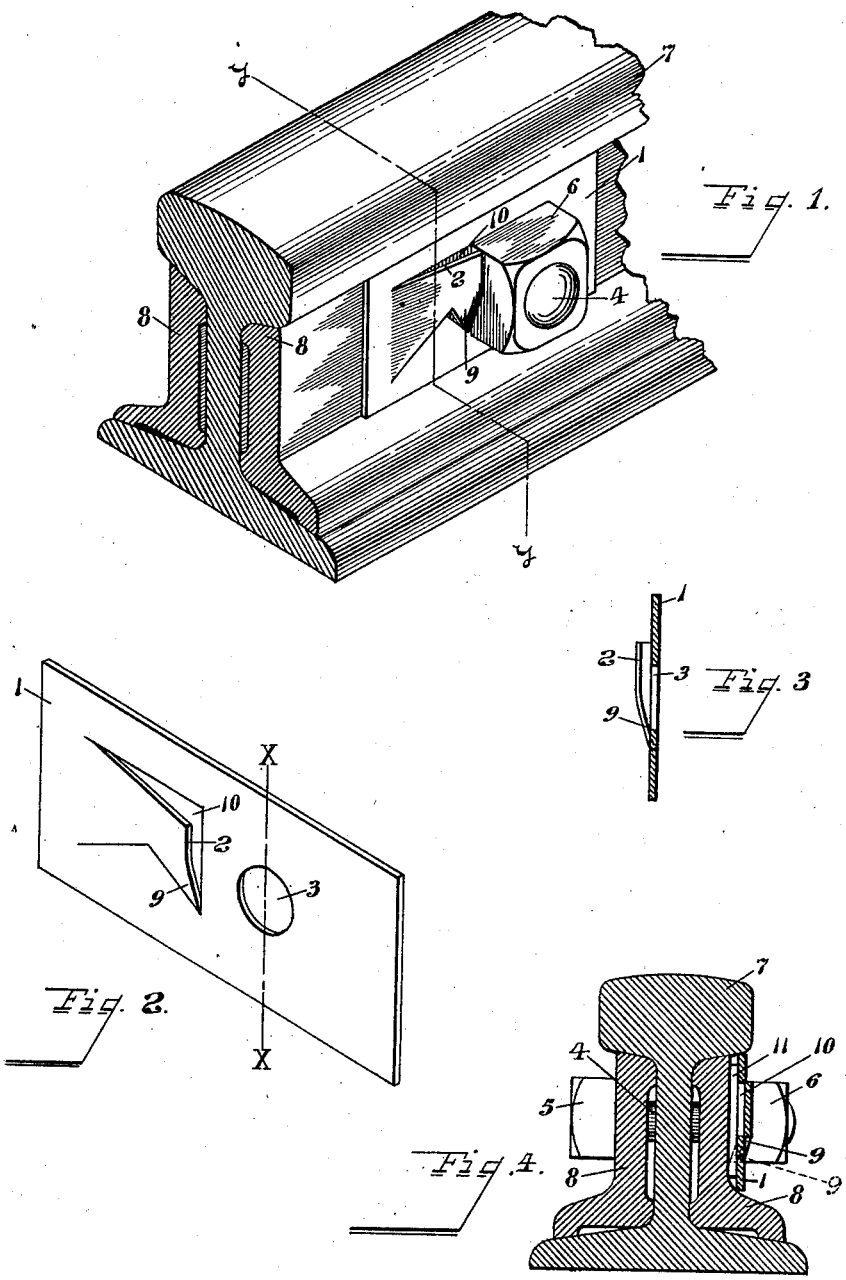

UNITED STATES PATENT OFFICE.

JAMES A. TRUMAN, OF SPRINGFIELD, OHIO, ASSIGNOR OF ONE-SIXTH TO CLAUDE E. ALLEN, ONE-SIXTH TO LEONARD TRUMAN, ONE-SIXTH TO GUY TRUMAN, ONE-SIXTH TO OLIVER COBERLY, AND ONE-SIXTH TO GROVER GRIMES, ALL OF SPRINGFIELD, OHIO.

NUT-LOCK.

1,037,085.  Specification of Letters Patent.  Patented Aug. 27, 1912.

Application filed February 7, 1911. Serial No. 607,184.

*To all whom it may concern:*

Be it known that I, JAMES A. TRUMAN, a citizen of the United States, residing at Springfield, in the county of Clark and State of Ohio, have invented certain new and useful Improvements in Nut-Locks, of which the following is a specification.

This invention relates to improvements in nut locks, and it particularly relates to a nut lock of the spring-tongue type.

The object of my invention is to provide a lock for nuts which will be efficient in operation, simple in construction and cheap to manufacture; a further object being to provide a lock of the type referred to which will operate equally well with either four-sided, hexagon or octagon nuts.

The invention consists in the constructions hereinafter described and set forth in the claims.

In the accompanying drawings:—Figure 1 is a perspective view of a portion of a rail and its fish plates showing my improved nut lock applied thereto. Fig. 2 is a perspective view in detail of the lock. Fig. 3 is a section of the same on the line X—X of Fig. 2. Fig. 4 is a section on the line Y—Y of Fig. 1.

Like parts are represented by similar characters of reference in the several views.

As before stated, my improved nut lock is of the spring-tongue type in which a tongue is formed in the body of a sheet of spring metal so arranged that when the nut is tightened it will spring the tongue out of the path of the corners of the nut, but permit the tongue to spring back again into a position to engage the sides of the nut and prevent it from turning backwardly. Nut locks of this character heretofore devised have been so constructed that the corners of the nut engage the base of the tongue, it being necessary to arrange the tongue either in an angular direction or in a transverse direction across the metal plate from which the tongues are formed. This not only necessitates the cutting of the plate to a point near its edge, and even in some cases to the edge, thereby weakening the plate, but owing to the fact that the corners of the nut engage the base of the tongue there is a tendency to spread the tongue out and cause it to lose its elasticity and locking efficiency. Further, heretofore, no lock of the spring-tongue type has been devised which is applicable to all forms of nuts; that is, when located properly for a square-nut, it would not operate with a hexagon nut, because the corners of the hexagon nut, not extending out so far as those of the square nut, would, instead of riding over the base of the tongue, strike the edge thereof and become locked against forward movement, or the tongue would lie out of the path of movement of the corners of a hexagon nut altogether.

In my improved device I have so arranged and constructed the tongue that the corner of the nut in turning will engage the outer or free end of the tongue instead of the base and the construction also permits me to arrange the tongue in a longitudinal direction with respect to the metal plate from which it is formed, thereby better retaining the rigidity of the plate. Further, the device is equally applicable, without change, to the use of hexagon and octagon nuts as well as square nuts.

In the drawings, 1 represents a plate of spring metal, from which is formed a tongue 2, this tongue being so cut that it will extend in a longitudinal direction of the plate.

3 represents the opening through which passes the bolt 4, the head of which is represented by 5, and the nut by 6.

In the drawings I have shown my device applied to a railway rail-joint, the rail being represented by 7 and the fish plates by 8. In forming the device, the tongue 2 is bent laterally from the body of the plate as shown but is provided with an incline or cam-shaped portion 9, the point of which lies flush with the surface of the plate. The parts are so disposed with respect to each other that the entire free end of the tongue will lie closely adjacent to and parallel with one of the sides of the nut when said nut is in locked position, so that when the nut is turned the corners thereon will ride up the inclined surface 9 and press the tongue 2 back into the slot 10 out of the path of movement of the nut. As the corners of the nut ride off of the tongue it will spring back into the locking position shown in Fig. 1.

In order to prevent the inclined part 9 from becoming straightened out by contact with the fish plate when it is pressed through the slot 10 by the turning of the nut, I have interposed between the plate 1 and the fish plate a washer 11 which leaves a space between the respective plates to receive the point 9 as shown in dotted lines in Fig. 4.

By this construction it will be seen that the corners of the nut in turning will contact the free end of the tongue with the consequent advantages heretofore explained. It will also be seen that such a device is adapted to nuts of different kinds as heretofore explained, the only alteration, if any, necessary being the changing of the inclination of the part 9.

Having thus described my invention, I claim:

1. In a nut lock, a plate having a perforation to receive a bolt or other device having a nut, a spring-tongue formed from said plate the free end of which lies parallel with and adjacent to one side of said nut when said nut is in locked position, said tongue projecting away from the surface of said plate adjacent said nut, and an inclined part on the free end of said tongue, one portion of which lies substantially flush with the surface of said plate and in the path of movement of the corners of said nut.

2. In a nut lock, a metal plate having a perforation to receive a bolt or other device having a nut, a spring-tongue formed from said plate and projecting away from the surface thereof, the free end of said tongue having an inclined part which stands closely adjacent to and parallel with one of the sides of said nut when said nut is in locked position.

3. In a nut-lock, a plate having a perforation to receive a bolt having a nut, said plate also having a spring tongue normally extending away from the surface of said plate, said tongue having an inclined part which extends to a point substantially flush with the surface of said plate in proximity to said nut, and a washer about said bolt between said plate and the device to which parts are applied, substantially as and for the purpose specified.

4. In a nut lock, a plate having a perforation to receive a bolt having a nut, said plate having formed therefrom an integral spring tongue normally standing away from the surface of said plate, the free end of which lies adjacent to and parallel with one of the sides of the nut in the locked position thereof, said tongue having an inclined part which extends to a point substantially flush with the surface of said plate in proximity to the said nut, and a washer about said bolt between said plate and the device to which the parts are applied, substantially as and for the purpose specified.

In testimony whereof, I have hereunto set my hand this 3rd day of February 1911.

JAMES A. TRUMAN.

Witnesses:
 CHAS. I. WELCH,
 ELSA K. SMITH.

---

Copies of this patent may be obtained for five cents each, by addressing the "Commissioner of Patents, Washington, D. C."